United States Patent [19]
Christensen

[11] Patent Number: 6,130,794
[45] Date of Patent: Oct. 10, 2000

[54] STATISTICAL MONITORING OF DATA CHANNELS FOR ENHANCED DATA RECOVERY PERFORMANCE

[75] Inventor: Thomas C. Christensen, Bethlehem, Pa.

[73] Assignee: Lucent Technologies Inc., Murray Hill, N.J.

[21] Appl. No.: 09/107,815

[22] Filed: Jun. 30, 1998

[51] Int. Cl.[7] .................................................. G11B 5/09
[52] U.S. Cl. ............................................................ 360/53
[58] Field of Search ........................ 360/53, 46; 369/53; 375/349

[56] References Cited

U.S. PATENT DOCUMENTS

| | | |
|---|---|---|
| 4,821,125 | 4/1989 | Christensen et al. . |
| 5,416,646 | 5/1995 | Shirai ........................................ 360/53 |
| 5,557,482 | 9/1996 | Christensen et al. . |
| 5,600,500 | 2/1997 | Madsen et al. ............................ 360/53 |
| 6,014,277 | 1/2000 | Christensen et al. ..................... 360/53 |

*Primary Examiner*—W. Chris Kim

[57] ABSTRACT

Reading data from a data channel. The data channel is received by an input, and at least one data path processes the data channel to read data from the data channel. The data path is characterized by a plurality of data path parameters, and the data read may be successful or unsuccessful. A processor updates a log entry for the data if the data read was successful, wherein the log entry stores information related to the data path parameters that have produced successful data reads.

16 Claims, 2 Drawing Sheets

STATISTICAL MONITORING OF DATA CHANNELS FOR ENHANCED DATA RECOVERY PERFORMANCE

BACKGROUND OF THE INVENTION

1. Field of the Invention

The present invention relates to systems and methods for reading data stored on a storage medium, and, in particular, to multipath data reading systems for throughput sensitive applications, in which multiple data paths are used to simultaneously read data.

2. Description of the Related Art

There is often a need to read data stored on a storage medium or device, such as hard disk drives, optical disk drives such as CD-ROMs (compact disk-read only memory), floppy diskettes, tape drives, or other types of computer-readable storage media or devices, or data received from a communications system. The data is typically embodied in a data channel transmitted from a data source to the data reading system.

In such storage devices, data is stored in the form of signals that represent data bits, in a format that depends on the particular medium. The bits are typically stored in distinct physical portions or locations of the medium, such as individual sectors of given tracks, for hard drives. Each sector or location may be considered to store a "message" containing a finite number of bytes or bits of data. Raw data is typically read from the storage medium by some type of transducer to provide a "data channel" from which data is then read, by various techniques, with a data read or recovery system.

On a hard drive, data bits are stored in track sectors. A magnetoresistive (MR) head (i.e., the transducer) close to the surface of the spinning disk of a hard drive typically provides a head signal, from which specialized circuitry or other systems attempt to read data messages or sectors of data originally stored on the drive. Each data message to be read has a characteristic, or type. For example, in the above-described case the characteristic of a given data message is the sector number or location on which it was stored.

Two aspects of data storage devices are under constant pressure for enhancement. One is the continuing effort to increase storage density, and the other is the continuing effort to increase throughput by using higher speed components and improved techniques. For example, with respect to hard drives, storage density is improved by increasing the bit densities and by narrower, more closely-spaced data tracks. These changes result in a reduction of the size of each bit, which requires that the reading and writing capabilities be upgraded to higher levels of performance to maintain the same standard of reliability previously attained.

Among the characteristics that are designed to optimize drive performance during the read mode is delta-V, which is the voltage change per unit time threshold that is used to discriminate between data and noise signals on the data channel produced by the transducer. It has been common practice to set the delta-V value for optimum performance. However, the delta-V value that provides the best performance varies from transducer to transducer and, in a disk drive, also with the radial position of the transducer location, which is a function of the speed of the head relative to the disk surface. U.S. Pat. No. 4,821,125 (the '125 patent) addresses this problem with disk drive channel circuitry, which uses variable values for delta-V that can be set on a head-to-head and track-to-track basis. Such channel circuitry uses only a single delta-V value at a time, however, and thus requires data to be re-read for each delta-V value when errors are encountered. This disadvantageously decreases throughput because the disk must be rotated into the transducer location so that data can be re-read from the disk.

Another characteristic that is designed to optimize drive performance during the read mode is the timing window in which a bit is read from a medium. It has been common practice to center the window for optimum performance using variable frequency oscillator (VFO) window centering circuitry. However, the position of the timing window that provides the best performance can vary due to bit shift, which is caused by, for example, different transducer/disk combinations and tolerances in the VFO window centering circuitry. To address this problem, disk drive channel circuitry is known that uses a variable position timing window that can be shifted either early or late. For example, U.S. Pat. No. 4,958,243 and "Window-shifting Mechanism in Data Separator," *IBM Technical Disclosure Bulletin*, Vol. 30, No. 6, November 1987, disclose typical channel circuitry of this type. Such channel circuitry shifts the timing window for a whole data string, however, and thus requires data to be re-read for each desired shift of the timing window. This disadvantageously decreases throughput because the disk must be rotated into the transducer location so that data can be re-read from the disk.

Decreases in throughput are especially disruptive in applications where uninterrupted read data flow is of great significance, such as multimedia or other video applications. Decreased throughput in multimedia applications manifests itself in jerky visual motion or stopped scan updates in mid-screen while data is re-read, since there is a latency caused by re-reading a sector of data. When such latency is incurred in re-reading a sector of data in order to successfully read the data, the data reading and re-reading steps are sometimes referred to as data recovery. When no extra latency is incurred, i.e. when the data recovery system is able to successfully or adequately read the data from the data channel without a re-read, the data is simply "read" but not "recovered." A given data read system may be referred to as a data recovery system since such systems typically have the ability to "recover" data if necessary, i.e. if the first attempt at reading was unsuccessful.

One conventional approach employs a system, described in U.S. Pat. No. 5,557,482, col. 2, that compensates for bit shift driven by intersymbol interference, i.e., the first and last changes in a plurality of successive changes in the direction of magnetization will upon reading respectively result in an early-occurring and late-occurring data bit frame. This system uses one unique path for detection delay, one detection for framing data without any delay and another detection for framing the data with a delay equal to the anticipated intersymbol interference driven bit shift. Framing is strobed by a clock that is delayed a fraction of the anticipated intersymbol interference driven bit shift. The framing path is selected based on an inflexible set consecutive bit criteria, i.e., whether the bit that was read last corresponds to a change in the direction of magnetization or no change in the direction of magnetization. This system only compensates for intersymbol interference-driven bit shift using the unique set consecutive bit criteria rules.

Undesirable latency can also occur when reading or recovering data received from a data source other than a hard drive. For example, in the case of data received from other types of storage medium or from a communications system, the data source may also be requested to re-transmit a chunk of data when an error is detected.

U.S. Pat. No. 5,557,482, issued to Christensen et al. on Sep. 17, 1996, for "Multipath Channel Apparatus and Method for Data Storage Devices and Communications Systems Wherein a Data Path Is Selected Based on Errors" (the '482 patent), the entirety of which is incorporated herein by reference, describes a multipath channel apparatus for a data storage device wherein data is stored on a storage medium and is read from the storage medium by a transducer, or for a data communications system wherein data is transmitted to a receiver. In the '482 patent, a data channel having a plurality of data paths is operatively connected to the transducer to receive data read from the storage medium by the transducer, or operatively connected to receive data demodulated by the receiver or base band data received by the receiver. Preferably, each of the data paths has a differing parameter value, or different sets of parameters that define and characterize the operation of various components of each data path. An error checking unit checks customer and redundancy data from each of the data paths. A selecting unit, which is responsive to the error checking unit, selects data from one of the data paths based on a favorable error correcting code (ECC) syndrome for the data (typically a chunk of data such as a sector of data in the case of a hard disk drive). Thus, by using multiple data paths, the chance of successfully reading the data in the data channel by at least one of the data paths is increased.

Traditional magnetic recording channel designs utilize a single "path" for the data between the head and the decoded data standardizer, where a path provides certain processing, filtering, detection and/or standardization functions for reads of data applied thereto. As explained above, systems utilizing a multipath design can have enhanced data read techniques, which are especially useful in throughput-sensitive applications such as multimedia. However, even in a multipath system, if data is not read successfully the first time the transducer reads data from a given sector of a given track, the necessity to re-read or engage in other data recovery procedures (DRP) can cause interruptions that are extremely detrimental, particularly in throughput intensive situations such as video or multimedia applications.

SUMMARY

A system for reading data from a data channel. The data channel is received by an input, and at least one data path processes the data channel to read data from the data channel. The data path is characterized by a plurality of data path parameters, and the data read may be successful or unsuccessful. A processor updates a log entry for the data if the data read was successful, wherein the log entry stores information related to the data path parameters that have produced successful data reads.

DESCRIPTION OF THE PREFERRED EMBODIMENT

In the present invention, as described in further detail below, statistical tracking of data recovery based on type of data processed is used to dynamically vary the data recovery system parameters so as to improve data read performance. In one embodiment, a multipath channel data recovery system is employed that takes advantage of statistically local transducer (e.g., magnetic head) performance repeatability to enhance error rate performance.

Multipath Data Recovery System

Figure 1:
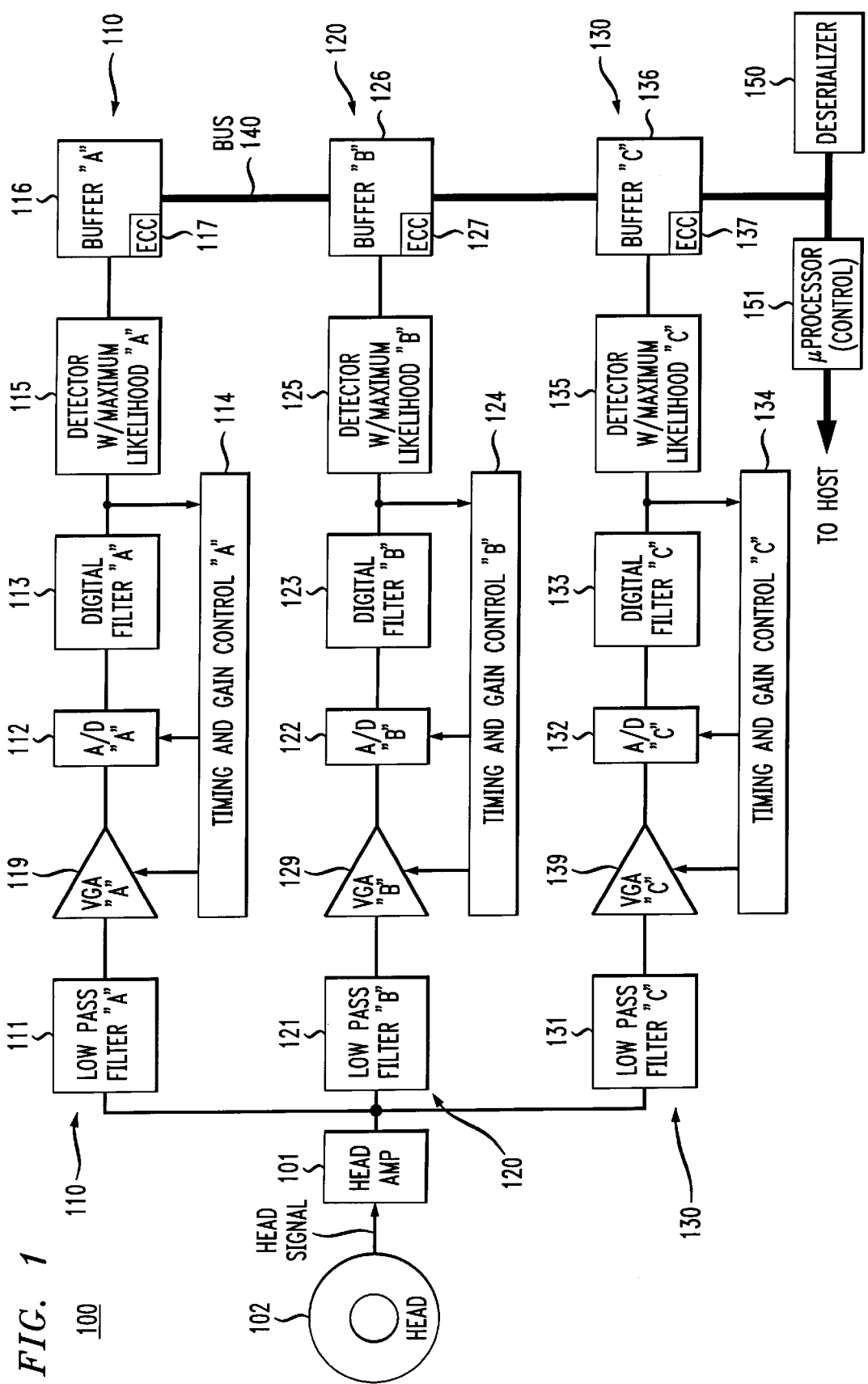
FIG. 1 is a schematic block diagram of a multipath channel data recovery system for a data storage device, in accordance with an embodiment of the present invention.

Referring now to FIG. 1, there is shown a schematic block diagram of a multipath channel data recovery system 100 for a data storage device, such as a hard disk drive (not shown), in accordance with an embodiment of the present invention. Multipath channel data recovery system 100 comprises an input device such as head amplifier 101, which receives a head signal from a MR head (transducer) 102 of a hard disk drive. Head amp 101 may be provided as part of an arm electronics module electrically connected via lead wires to the MR head, mounted on a flexible cable, and also electrically connected to the remainder of the disk drive circuitry by conductors in the flexible cable. Either the input or output node of head amp 101 may be considered to be a datapath input which allows the datapaths to receive the data channel.

This head signal provides the data channel from which system 100 attempts to read data. System 100 comprises three partial-response maximum-likelihood (PRML) data paths 110, 120, and 130 (or A, B, and C). Each data path preferably contains similar processing components, although each data path preferably is configured with different parameters so that each processes the data differently so as to maximize the chance at least one of the data paths 110, 120, and 130 will successfully read data from the data channel. For example, data path 110 comprises low pass filter 111, variable gain amplifier (VGA) module 119, analog to digital (A/D) converter module 112, digital filter 113, timing and gain control 114, detector module 115, and buffer 116. Each data path's buffer is coupled to controller bus 140, which is in turn coupled to deserializer 150 and controller module 151, a microprocessor. Controller module or processor 151 is coupled by a bus to a host processor (not shown).

The components of each data path may be implemented in hardware, software, or a combination thereof. In one embodiment, some or all of the components of system 100 may be implemented in an integrated circuit (IC). In alternative embodiments, the data paths may have a different set of processing components or modules than shown in system 100, or each data path may have a set of processing components different than other data paths. For example, instead of PRML data paths, in alternative embodiments, other data path configurations may be employed, such as the data paths described with reference to FIG. 5 of the '482 patent, which use a common automatic gain control (AGC)/equalizer module, a common detector module, and a common variable frequency oscillator (VFO) module.

Referring once more to data paths 110, 120, and 130 of system 100, an analog read signal is obtained from head amp 101, which is an amplified version of the head signal received from the hard drive MR head. Low pass filter modules 111, 121, and 131 receive the amplified read signal from head amp 101 and filter these read signals. The filtered read signals are respectively applied to VGA modules 119, 129, and 139 for variable amplification. The amplified read signals are respectively applied to A/D modules 112, 122, and 132, which provide, for example, sixty-four possible 6-bit sampled values.

The samples of A/D converter modules 112, 122, and 132 are respectively applied to digital filter modules 113, 123, and 133, such as a ten tap finite impulse response (FIR)

digital filter. The filtered signals from digital filter modules 113, 123, and 133 are respectively applied to detector modules 115, 125, and 135, and to timing and gain control modules 114, 124, and 134. The detector modules 115, 125, and 135 each include, for example, a Viterbi decoder (not shown) coupled to a 0/4,4 decoder to complete the maximum-likelihood (ML) detection process for data read back. The timing and gain control modules 114, 124, and 134 respectively provide a gain and AC coupling pole control signal to VGA modules 119, 129, and 139, and provide timing control signals to A/D modules 112, 122, and 132.

The low pass filter modules 111, 121, and 131, VGA modules 119, 129, and 139, A/D modules 112, 122, and 132, digital filter modules 113, 123, and 133, detector modules 115, 125, and 135 and/or timing and gain control modules 114, 124, and 134 have differing parameter values. These parameter values include, for example, information about the surface, track, and sector, the cut-off frequency for each low pass filter module (also known as continuous time filter settings), the gain and offset of each VGA module, the tap weights for each digital filter module, decoder code type, and other parameters that control the functioning of the detector module, A/D module, and timing and gain control module. Preferably, the parameter values of low pass filter module 121, VGA module 129, A/D converter module 122, digital filter module 123, detector module 125, and timing and gain control module 124 are initially chosen to optimize drive performance under "normal" conditions; and the parameter values of low pass filter modules 111 and 131, VGA modules 119 and 139, A/D converter modules 112 and 132, digital filter modules 113 and 133, detector modules 115 and 135, and timing and gain control modules 114 and 134, are chosen to optimize drive performance under other conditions. However, as described in further detail below, these parameter values are adjusted on a sector-by-sector basis based on statistical data related to past data read successes and characteristics. Each time a new sector of data is to be read, the parameter values for the data paths are set so as to optimize the chance that at least one data path is able to successfully read data for the new data sector, based on accumulated statistics concerning previous reads of data from the same sector.

The outputs of detector modules 115, 125, and 135 are respectively applied to buffer modules 116, 126, and 136. Although not shown in FIG. 1 for the sake of clarity, buffer modules 116, 126, and 136 also respectively receive a timing control signal from timing and gain control modules 114, 124, and 134 for clocking the outputs of detector modules 115, 125, and 135 into and out of buffer modules 116, 126, and 136.

Buffer modules 116, 126, and 136 temporarily store a sector of standardized and decoded data from the disk sector respectively received from detector modules 115, 125, and 135. In addition, buffer modules 116, 126, and 136 respectively contain ECC syndrome modules 117, 127, and 137 that calculate and temporarily store ECC syndromes. ECC syndrome module 117, for example, calculates and stores the ECC syndrome for the sector of standardized and decoded data stored in buffer module 116, and the other ECC syndrome modules operate similarly.

Buffer modules 116, 126, and 136 are connected via a controller bus 140 to a controller module 151, as are ECC syndrome modules 117, 127, and 137. Controller module 151 polls the calculated ECC syndromes stored in ECC syndrome modules 117, 127, and 137, as described in further detail below with reference to FIG. 2. Controller module 151 compares the calculated ECC syndrome stored in ECC syndrome module 127, for example, against an interpretation table to provide error information about the data stored in buffer module 126. Controller module 151 operates similarly with respect to buffer modules 116 and 136. For example, if all of the bytes of the ECC syndrome are zeroes, then this is typically interpreted to represent no errors in the data. With small errors, typically some of the bytes of the ECC syndrome identify the location of an error in the data, and other bytes of the ECC syndrome identify which bits need to be changed to correct the error.

Controller module 151 controls switches (not shown) via controller bus 140, to selectively output the sectors of standardized and decoded data stored in buffer modules 116, 126, and 136. Controller module 151 selects which buffer's sector of data to output (to a host processor using the data, for example), based on the comparisons of the error information, derived for each of the parallel data paths, to a prioritization list.

The prioritization list may typically start with a preference for zero errors in a nominal data path. If there are errors in the nominal data path, then the preference would typically change to no errors in another of the data paths. If errors occur in all of the data paths, then it may be desirable to change the preference to one correctable error in the nominal data path. Likewise, if there is more than one correctable error in the nominal data path, then it may be desirable to change the preference to one correctable error in another of the data paths. The optimal prioritization order depends on how significant the error is versus a delay time. For example, a few incorrect pixels in a video display is typically less problematic than a pause in motion in the video display. The reverse is typically true for digital data. Thus, in video usage, the preference is typically to use higher levels of ECC correction before re-reads are tried. The reverse is typically true for digital data.

Accordingly, in one embodiment, controller module 151 is adapted to identify the type of data in a sector, e.g., whether the data is video or graphics data. This may be done, in one embodiment, by controller module 151 consulting a look-up table storing information correlating the type of data with a given sector, or by interpreting header data transmitted with the sector of data, or by receiving type information from the hard disk drive or data source. Thus, controller module 151 knows the type of data and thus can use one of several different read strategies depending on the data type. For example, a first read strategy and accompanying prioritization list may be used in the case of video data, to select which buffer's sector of data to output; a second read strategy and accompanying prioritization list may be used in the case of graphics data. For example, the video strategy could be configured to forgive (skip) updates of read parameters or some data inaccuracies if updating or correcting in this regard would cause an adverse impact on throughput. This may be implemented, in one embodiment, by use of a timer configured to inform controller module of the time remaining before the next sector's data is available, to override normal actions that would otherwise be taken, in order to preserve throughput, at the sacrifice of somewhat lower video quality level.

When controller module 151 selects one of the buffer modules, for example buffer module 116, the sector of standardized and decoded data stored in buffer module 116 is provided to serial/deserializer module 150. Preferably, the standardized and decoded data stored in the selected one of buffer modules 116, 126, and 136 is clocked out of the selected buffer module before or as the next sector of standardized and decoded data is clocked into buffer modules 116, 126, and 136 using the read clock provided by timing control signal from timing and gain control modules 114, 124, and 134. Alteratively, buffer modules 116, 126, and 136 are large enough to accommodate a plurality of sectors of the standardized and decoded data.

Serial/deserializer module 150 deserializes the received serial data and provides the resulting deserialized data to the using system through controller bus 140 and controller module 151.

In multipath system 100, therefore, each data path receives the same amplified data channel from head amp 101, and processes the data channel in accordance with the data path's respective components, using its own parameters. If at least one data path successfully reads data from the current sector for the data channel being processed, the data may be transmitted to a host processor for further processing or display, for example. If more than one data path reads data, the above-described prioritization list may be utilized to select which data path buffer's sector of data to use. If none of the data paths successfully reads data, a decision may be made about what further steps to take, e.g. the storage medium may be instructed to re-read the sector and re-transmit the sector data over the data channel.

Sector-Level Data Read Success Statistics

Magnetic recording components, as well as components of other types of storage media, have been long known to exhibit variation in performance even in relatively controlled situations for the same components over time. Such systems also exhibit variation in performance between component combinations due to manufacturing differences. In previous data recovery systems, including storage media data recovery systems where variability of parameters is allowed, such as the '125 patent discussed above, data is not kept on which settings result in the best performance so that these settings are always used first rather than the factory default settings. Similarly, in the multipath system disclosed in the '482 patent described above, no allowance is made for determining the utility of the paths, so that if one path was rarely if ever used, then different parameter settings could be introduced which result in improved performance during re-reads for these paths.

In the present invention, therefore, statistics about the success of previous data read operations or phases for particular sector reads are tracked and taken into account by varying one or more data recovery system parameters to improve performance on successive reads of the same sector. For example, if a given set of parameters that define a data read path (either the sole path of a single-path system such as described in the '125 patent or one path of a multipath system such as described in the '482 patent) is rarely successful in reading a given sector of a given track of a hard drive, and if another set of parameters is frequently successful, then information is stored for this sector to enable the more successful parameters to be utilized or taken into account in subsequent reads of this sector. Each time the sector is to be read subsequently and a data channel corresponding thereto is to be read, the path's parameters are adjusted in accordance with this accumulated information, so as to increase the chance of a successful data read. If the path is one of three multipaths, then the parameters for all three may be adjusted accordingly, as described in further detail below.

Polling Procedure

Figure 2:
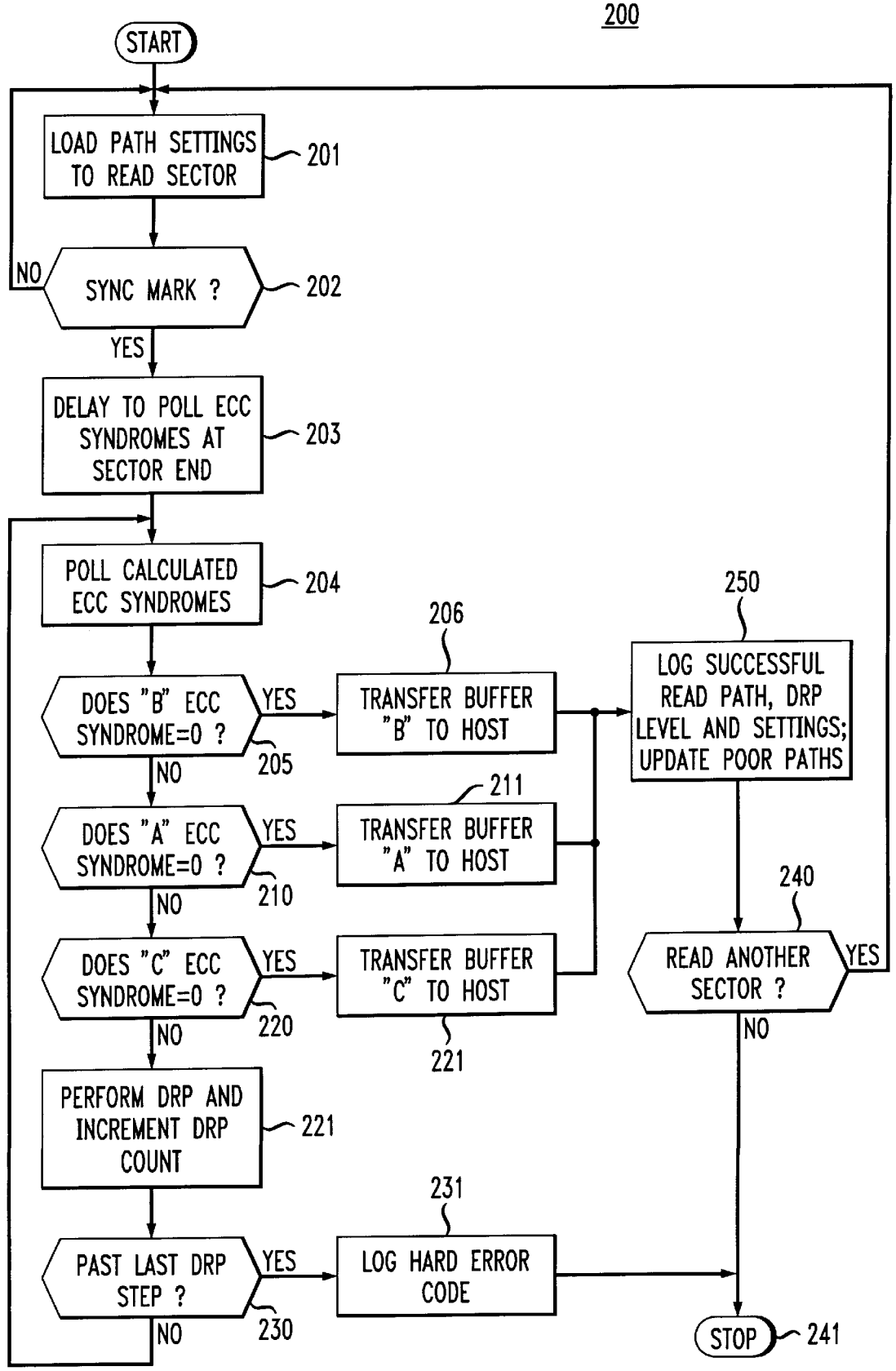
FIG. 2 is a flow chart showing a polling procedure performed by the multipath channel data recovery system of FIG. 1, in accordance with an embodiment of the present invention.

Referring now to FIG. 2, there is shown a flow chart showing a polling procedure 200 performed by controller module 151 of multipath channel data recovery system 100 of FIG. 1, in accordance with an embodiment of the present invention. Polling procedure 200 illustrates a case where all the power of the ECC code is used for detection, i.e., the ECC code is not used for correction. Before beginning receipt of the sector of data, in step 201, controller module 151 checks the statistics for the current sector stored in the log and loads each data path's components with new parameter values that are changed from default or previous parameter values based on these statistics, to optimize the chance of a successful data read from the data channel of the data in the sector.

In step 202, the polling procedure queries whether a data sync mark has been detected. If a data sync mark is detected in step 202, then the polling procedure proceeds to step 203, which produces a delay so that the ECC syndromes are polled at the end of the sector. If a data sync mark is not detected in step 202, then step 202 is repeated. During the delay, a sector of data is provided over the data channel applied to data paths 110, 120, and 130. After the delay of step 203, the calculated ECC syndromes stored in ECC syndrome modules 117, 127, and 137 are polled (step 204).

After the polling of step 204, the polling procedure queries whether the calculated ECC syndrome stored in ECC syndrome module 127 is zero, indicating no error (step 205). If there is a match in step 205, the sector of data in buffer 126 is transferred to the host, via the method described previously (step 206). If there is not a match in step 205, the polling procedure queries whether the calculated ECC syndrome stored in ECC syndrome module 117 is zero, indicating no error (step 210). If there is a match in step 210, the sector of data in buffer 116 is transferred to the host (step 211). If there is not a match in step 210, the polling procedure queries whether the calculated ECC syndrome stored in ECC syndrome module 137 is zero, indicating no error (step 220). If there is a match in step 220, the sector of data in buffer 136 is transferred to the host (step 221).

If there is not a match in step 220, a step of a conventional DRP is performed and a DRP count is increased by one (step 221). Then, the polling procedure queries whether a last step of the conventional DRP has been completed (step 230). If the last DRP step has been completed, then a hard (noncorrectable) error and an error code are logged (step 231) and the polling procedure terminates (step 241). If the last DRP step has not been completed, however, then step 204 is repeated but with the DRP step having been performed.

When one of the buffers 116, 126, and 136 has its data transferred to the host, then the polling procedure logs information related to the successful read path and the sector, such as the data path's various adjustable component parameters, in a log file (step 250), as described in further detail below. Next, the polling procedure queries whether there is another sector to be read (step 240). If there is another sector to be read, then step 202 is repeated. If there is no other sector to be read, then the polling procedure terminates (step 241).

Statistical Sector Log

Step 250, as described above, involves updating statistics in a log for a current sector when data received therefrom has been successfully read by one of the data paths 110, 120, or 130. The statistical data may be stored in some form of memory, such as RAM, and/or on a storage medium, such as the hard disk drive itself. In one embodiment, the log contains a plurality of entries, one for each sector of the hard disk, where each entry contains various information about the data read, such as the parameter settings and the head number. The track number and sector number are implicit in the organization of the log file or may also be stored explicitly within each entry. Each time a new sector of data is to be read, controller module 151 thus consults the applicable log entry for that sector and sets or adjusts the data paths' parameters based on prior statistics.

For example, suppose that data path 120 initially has parameter values set a priori so as to optimize drive performance under "normal" conditions; and the parameter values of the components of data paths 110 and 130 initially vary by some amount from those of data path 120. For example, some of the parameter values for data path 110 can be initially set to be generally slightly smaller (e.g., 5%) than those of data path 120, and some of the parameter values for data path 130 can be initially set to be generally slightly larger (e.g., 5%) than those of data path 120. Further suppose that sector 8 is read, and is unsuccessfully read by data paths 110 and 120, but is successfully read by data path 130. The parameter values for data path 130 are thus stored in the log entry for sector 8, so that the next time a sector 8 read occurs, controller module 151 can set the parameter values for all three data paths accordingly. For example, data path 120 may receive the settings that data path 130 successfully used during the previous sector 8 read, and data paths 110 and 130 may be adjusted according to data path 120's new settings.

Alternatively, instead of simply storing the most recent successful data path's parameters in the log entry and thus replacing previous parameters, a running average of data path parameters may be kept in the log entry and adjusted in accordance with the most recent successful data path's parameters, so that each log entry contains a running average of the most recent successful data path parameter values. Alternatively, each different permutation of parameter value settings actually used can be stored, along with a count of the number of successful data reads using these settings.

In one embodiment, whichever parameters are indicated by the statistical log entry as having most success are used in the data path having first read priority in the prioritization list used by controller module 151. Variations on the most successful set of parameters are then used for the other data paths or for DRPs.

Therefore, in the present invention, data read success statistics are maintained for each sector and used to dynamically determine optimal data path parameter values for subsequent reads of the sector. This allows the parameter settings for each data path to be selected based on past performance in reading data from that sector. The present invention therefore advantageously allows a great variety of head and disk combinations to be tolerated. This allows, for example, a drive manufacturer to reduce cost by using a wider range of head and disks while still achieving superior error rate (data read) performance.

The statistical monitoring of the present invention may also be advantageously employed monitor for degradation in the file. For example, the parameter setting combinations that provide successful data reads may change gradually over time in accordance with a pattern that can indicate degradation of data in the sector (or track). This information can be used to determine whether a sector needs reallocation, or if degradation in file performance to a catastrophic level is imminent, in which case a RAID file tradeout may be triggered to avoid catastrophic failure. For example, the statistical information garnered from the data channel performance can be used to indicate if flyheight is becoming an issue or if impending failure of the drive may imminently occur. Sectors where more errors are occurring per total number of reads than previously may be flagged for action.

Alternative Embodiments

In an alternative embodiment, other adjustments may be made to a data recovery system based on past success statistics, to optimize the chance for first-read success of a given sector of a storage medium. For example, a given storage medium may comprise multiple sub-media, such as a hard drive with multiple disk surfaces, MR heads, head signals and corresponding data channels. In such a system, a plurality of data paths (e.g., three) may be devoted to each data channel initially. However, as data read statistics are accumulated indicating which surfaces experience the most soft (correctable) errors, channel paths are shifted from the more successful surfaces to the more problematic surfaces. The allocation of data paths to surfaces may be also considered to be "parameters" that define the data recovery system's configuration, and this embodiment also involves selecting system parameters (which can include both parameter values for individual data paths plus which surface each data path is devoted to) based on statistics indicating past data read performance.

For example, in a system having ten disk surfaces and thus ten data channels produced simultaneously, three data paths each may be used initially for each of ten disk surfaces, or thirty total data paths. If these statistics indicate that surface 7, for example, consistently has sufficiently lower than average performance, some of the data paths from the better-performing surfaces may be shifted to the data channel for surface 7. For example, one data path can be taken from each of the other nine surfaces, leaving them with two data paths each (which may be sufficient for head/disks with good soft error rates) and devoting twelve data paths to reading data in parallel from the data channel for surface. This would advantageously allow fewer total data paths to be provided with each disk drive than if all ten surfaces had to have twelve data paths each. Alternatively, in a multiple-surface media system as described immediately above, data paths may be instantaneously shifted from one surface to another on a sector-by-sector basis.

In an embodiment described above, discrete sectors of data, corresponding to physical hard disk drive sectors, are processed by the data paths. In general, however, the present invention is applicable to blocks or groups of data other than hard drive sectors. For example, the present invention is also applicable to blocks of data from tape drives and tracks of data from CD-ROMs, or also to groups of data received from a communications system, such as a modem system, closed circuit cable system, or the like.

In general, the data paths process a finite sequence of data bits received via the data channel, which may be referred to as a data "message," or simply as data, and the parameters of the data recovery system are selected based on statistics indicating past data read performance for data messages having the same data message characteristic or type. In the case of storage media, these statistics may be based on the sector or block level, in accordance with the physical location groups of data are stored on the medium. In the case of data received from a communications system, statistics may be kept based on other data criteria than "sector" number, such as time of day of the data's transmission. In this case, each data message is characterized by the time of day of its transmission.

Thus, in general, the statistics tracked are statistics that relate to characteristics of data to be read, where one set of statistics is stored for each separate characteristic of a plurality of characteristics. For example, where data messages originate from disk sectors, there is one log entry having statistics for each sector. Where, for example, data messages are characterized by time of day, there is one log entry for each time unit into which the day is divided, e.g. 24 one-hour intervals. In the case of a hard drive, what characterizes the data is the sector from which it originates, since there may be variations in head/disk performance based on which sector the data comes from. In the case of data received from a communications system by a receiver, the time of day of the message may correlate with the data's characteristics and therefore with particular data path parameter settings.

The present invention is, therefore, not limited to hard disk drives but may be employed with other storage media such as optical disk drives (e.g., CD-ROMs), floppy diskettes, tape drives, or other types of computer-readable storage media or devices, in which data is stored as discrete data groups or messages on a plurality of different physical portions. For example, data is stored in the form of, and read out from, "tracks" from CD-ROMs. The data provided by a laser reading a track of a CD-ROM, or from a given physical blocks or sub-blocks of data portions of a tape in a tape drive, are analogous to sectors of data provided by hard drives.

Therefore, in the case of a storage medium as the data channel source, the sequence of data bits (or data message) correspond to a sector's worth of data. Such a sequence of data bits may be referred to in different contexts as a group, block, chunk, subset, unit, or sector of data. Once a data message is successfully read by at least one data path, another data message can be processed, and so on, as described above. Thus, as used herein, a data channel carries consecutive sectors of data which a data recovery system attempts to read, whether these "sectors" come from actual sectors of a hard drive or other groupings of data for other storage media.

Embodiments of the present invention have been described herein in which data messages (such as sectors of data) are read from a data channel provided by a transducer from a given storage medium, where data messages correspond to physical disk sectors in the case of hard disk drive data channel sources, or to other physical portions of the storage medium depending on its nature (e.g., blocks, tracks, and the like). However, in alternative embodiments, the present invention may also be applied to data reads from a data channel received by a receiver from a data communications system. Statistics may be kept on various characteristics of data received, such as time of day. Thus, instead of having an entry for each "sector" of a disk, a log file can store an entry for each ten-minute period of the day, with information stored about which parameter settings have been most successful in reading data messages transmitted during this time. Alternatively, the statistics tracked for transmitted data messages may also be based on the identity (ID) of the transmitter, location of the transmitter, or on the type of data (e.g., video, audio, or other forms of data), since different parameters may have better data read success depending upon the data's origin or type. For a storage medium data channel source, statistics may also be broken down on a basis other than sector number, such as time of day, instability state of the head, reads between writes, origin of message, identity or nature of transmitting system, and the like. In this case, a data message to be processed by the data recovery system is associated with the statistics log entry for whichever characteristic the data message is associated with, depending on which type of characteristic the log is based on. For example, if the log is divided by time of day, then each incoming data message is treated as being associated with whichever log entry time correlates to the time of the incoming data message. The appropriate log entry is consulted by controller module 151 to see what data read statistics are associated with previous reads at that time of day, and the data path parameters are adjusted accordingly to maximize the chance of a successful read. Similarly, if the log is divided into different entries for different instability states of the head, then an incoming data message (e.g., a sector of data) is classified depending on the current instability state of the head. The appropriate log entry is consulted by controller module 151 to see what data read statistics are associated with previous reads at that head instability state, and the data path parameters are adjusted accordingly to maximize the chance of a successful read.

The present invention can also be embodied in the form of computer-implemented processes and apparatuses for practicing those processes. The present invention can also be embodied in the form of computer program code embodied in tangible media, such as floppy diskettes, CD-ROMs, hard disk drives, or any other computer-readable storage medium, wherein, when the computer program code is loaded into and executed by a computer (such as a computer element of a headend or router), the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits in the headend or router thereof to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for reading data from a data channel, comprising:

(a) an input for receiving a data channel carrying a data message having a known data characteristic of a plurality of data characteristics;

(b) at least one data path for processing the data channel to read the data message from the data channel, wherein said data read may be successful or unsuccessful and the data path is characterized by at least one data path parameter; and (c) a processor for updating a log entry corresponding to the data characteristic if said data read was successful, wherein the log entry stores information related to the at least one data path parameter which was used to successfully read data.

2. The system of claim 1, wherein the processor sets the at least one data path parameter for the data path, before the data channel is received, in accordance with the contents of the log entry for the data characteristic of the data channel.

3. The system of claim 1, further comprising a plurality of data paths for processing the data channel to read the data message from the data channel, wherein the data paths have different data path parameters from one another.

4. The system of claim 1, wherein:

the data channel is provided from data stored on a storage surface of a storage medium system having a plurality of storage surfaces;

the data channel is produced by the storage medium system reading data stored in a particular location on a surface of the plurality of surfaces; and the data characteristic identifies the location and surface on which the data message is stored.

5. The system of claim 4, further comprising:

(d) a plurality of data paths for processing the data channel received from the surface to read the data message from the data channel, wherein the data paths have different data path parameters from one another, the system further comprising other data paths for processing other data channels received from other surfaces of the plurality of surfaces, wherein the processor shifts some of the other data paths to the plurality of data paths to process the data channel, before the data channel is received, if the contents of the log entry for the data characteristic of the data channel indicate inferior past data read performance for the surface relative to other surfaces from which the some of the other data paths are shifted.

6. The system of claim 1, wherein:

the input is a head amp;

the data channel is provided by a data communications system; and the data characteristic identifies one of the time of day at which the data message is received and an identity of the data communications system.

7. The system of claim 1, wherein:

the data channel is provided from data stored on a storage medium having a plurality of sectors;

the data channel is produced by the storage medium reading data stored in a sector of the plurality of sectors; and the data characteristic identifies the sector on which the data message is stored.

8. The system of claim 7, wherein the processor monitors log entries for each sector to determine when data for each corresponding sector has degraded.

9. The system of claim 1, further comprising a magnetic head for providing the data channel.

10. The system of claim 1, wherein:

each data path comprises a low pass filter module having a cut-off frequency, a variable gain amplifier (VGA) module having a gain and an offset, and a digital filter module having a plurality of tap weights; and the at least one data path parameter for a particular data path is a plurality of data path parameters comprising the cut-off frequency for the low pass filter module of the data path, the gain and offset of the VGA module of the data path, and the tap weights for the digital filter module of the data path.

11. The system of claim 1, wherein the system is an integrated circuit.

12. The system of claim 1, wherein the input and the at least one data path are implemented in an integrated circuit.

13. The system of claim 1, further comprising an integrated circuit comprising the input and the at least one data path.

14. A method for reading data from a data channel, comprising:

(a) receiving a data channel carrying a data message having a known data characteristic of a plurality of data characteristics;

(b) processing the data channel with at least one data path to read the data message from the data channel, wherein said data read may be successful or unsuccessful and the data path is characterized by at least one data path parameter; and (c) updating a log entry corresponding to the data characteristic if said data read was successful, wherein the log entry stores information related to the at least one data path parameter which was used to successfully read data.

15. The method of claim 14, wherein step (b) comprises the step of processing the data with a plurality of data paths to read the data message from the data channel, wherein the data paths have different data path parameters from one another.

16. The method of claim 14, further comprising the steps of:

providing the data channel from data stored on a storage medium having a plurality of sectors; and producing the data channel by the storage medium reading data stored in a sector of the plurality of sectors, wherein the data characteristic identifies the sector on which the data message is stored.

* * * * *